United States Patent [19]  
Drelich et al.

[11] 3,928,676  
[45] Dec. 23, 1975

[54] SYNTHETIC RESIN COMPOSITIONS AND METHODS APPLYING THE SAME TO POROUS MATERIALS TO CONTROL MIGRATION THEREON

[75] Inventors: Arthur H. Drelich, Plainfield; George J. Lukacs, Perth Amboy, both of N.J.

[73] Assignee: Johnson & Johnson, New Brunswick, N.J.

[22] Filed: Mar. 8, 1974

[21] Appl. No.: 449,310

[52] U.S. Cl. ........ 427/341; 260/17 R; 260/17.4 ST; 260/29.6 MM; 427/302; 427/303; 427/342; 428/262; 428/290; 428/514
[51] Int. Cl.² ...................... B05D 7/00; C08L 1/28
[58] Field of Search ........ 260/17, 29.6 M, 29.6 BM, 260/29.6 MM, 17.4 ST, 33.4 R; 427/341

[56] References Cited
UNITED STATES PATENTS

| | | | |
|---|---|---|---|
| 2,455,937 | 12/1948 | Lowe | 260/29.6 |
| 2,901,452 | 8/1959 | West | 260/29.6 |
| 3,026,281 | 3/1962 | Harren | 260/29.6 |
| 3,280,050 | 10/1966 | Johnson | 260/17 |
| 3,332,794 | 7/1967 | Hart | 260/29.6 |
| 3,380,940 | 4/1968 | Hansi | 260/15 |
| 3,629,179 | 12/1971 | Bristol | 260/29.6 |
| 3,706,595 | 12/1972 | Drelich | 117/38 |
| 3,741,782 | 6/1973 | Stewart | 260/29.6 |
| 3,793,272 | 2/1974 | Koyanagi | 260/17 |
| 3,821,146 | 6/1974 | Drelich | 260/29.6 |

FOREIGN PATENTS OR APPLICATIONS

| | | | |
|---|---|---|---|
| 1,029,723 | 5/1966 | United Kingdom | 260/29.6 |
| 1,101,427 | 1/1968 | United Kingdom | 260/29.6 |
| 568,554 | 1/1959 | Canada | 260/29.6 |

*Primary Examiner*—Donald E. Czaja
*Assistant Examiner*—Edward Woodberry

[57] ABSTRACT

Stable, aqueous, colloidal synthetic resin compositions comprising: (1) from about 0.1% by weight to about 60% by weight of a colloidal synthetic resin; and (2) from about 0.01% by weight to about 2% by weight based on the dry solids weight of the colloidal synthetic resin, of an aluminum hydroxy salt of a high molecular weight, water-soluble, polymeric, polycarboxy-containing thickening resin; and methods of applying the synthetic resin compositions to porous, absorbent materials and controlling the migration or spreading thereon or penetration thereinto by applying the synthetic resin compositions to the porous, absorbent materials and substantially immediately diluting the synthetic resin composition to substantially immediately coagulate and precipitate the synthetic resin composition.

14 Claims, No Drawings

SYNTHETIC RESIN COMPOSITIONS AND METHODS APPLYING THE SAME TO POROUS MATERIALS TO CONTROL MIGRATION THEREON

The present invention relates to improved stable, aqueous, colloidal synthetic resin compositions and to methods of utilizing the same. More specifically, the present invention relates to stable, aqueous, colloidal synthetic resin compositions which are intended to be applied to porous or absorbent materials such as textile materials, paper, paper products, wood, leather, polyurethane and other foams, wall board, concrete, cinder block, etc. and to methods of applying such colloidal synthetic resin compositions to such porous or absorbent materials on which or into which the extent of the migration, diffusion, penetration, or spreading of such colloidal synthetic resin compositions is controlled.

GENERAL BACKGROUND

In many industries such as the textile, paper, paper products, wood, leather, polyurethane foam, printing arts, decorative arts, building materials and like industries, there is often a need to apply a stable, aqueous synthetic resin composition to porous or absorbent materials and to maintain such synthetic resin composition in the same shape, size and configuration, as well as in the same location, on the porous or absorbent materials where it was originally applied without undesirably migrating, penetrating, or spreading materially therefrom in any direction to any substantial extent on or into the porous or absorbent materials.

Such resins have found use in the coating industries for the coating or impregnation of woven, knitted, nonwoven and other textile fabrics, paper, paper products, wood, leather and other related materials. The resins are also used as adhesives for laminating materials or for bonding fibrous webs. These resins have also found wide use as additives in the manufacture of paper, the printing industry, the decorative printing of textiles, and in other industries.

PURPOSES AND OBJECTS

It is therefore a principal purpose and object of the present invention to provide improved, stable, aqueous, colloidal synthetic resin compositions which can be applied to porous or absorbent materials in such fashion as to control the extent of the migration, diffusion, penetration or spreading of the resin composition on or into the porous or absorbent materials.

STATEMENT OF THE INVENTION

It has been found that such purpose and object, as well as other purposes and other objects which will become clear from a further reading hereof, may be achieved by applying to the porous or absorbent materials a stable, aqueous, colloidal synthetic resin composition comprising from about 0.1% to about 60% by weight, and preferably from about 5% to about 50% by weight, on a solids basis of a colloidal synthetic resin and from about 0.01% by weight to about 2% by weight, and preferably from about 0.05% by weight to about 1% by weight, based on the weight of the synthetic resin (solids/solids basis), of an aluminum hydroxy salt of a high molecular weight, water-soluble, polymeric, polycarboxy-containing thickening resin; and controlling the migration or spreading thereon or penetration thereinto by substantially immediately diluting the synthetic resin composition to substantially immediately coagulate and precipitate the synthetic resin composition.

PREFERRED ILLUSTRATIVE EMBODIMENT

The present invention will be described in greater particularity herein purely for illustrative but not limitative purposes insofar as it relates to porous, aborbent, fibrous sheet materials and to their methods of manufacture. More particularly, however, the present invention is concerned with the so-called bonded, "nonwoven" textile fabrics, i.e., fabrics produced from textile fibers without the use of conventional spinning, weaving, knitting or felting operations.

Although not limited thereto, the invention is of primary importance in connection with nonwoven fabrics derived from "oriented" or carded fibrous webs composed of textile-length fibers, the major proportion of which are oriented predominantly in one direction.

Another aspect of the present invention is its application to nonwoven fabrics wherein the textile-length fibers were originally predominantly oriented in one direction but have been reorganized and rearranged in predetermined designs and patterns of fabric openings and fiber bundles.

Still another aspect of the present invention is its application to nonwoven fabrics wherein the textile-length fibers are disposed at random by air-laying techniques and are not predominantly oriented in any one direction. Typical nonwoven fabrics made by such procedures are termed "isotropic" nonwoven fabrics.

And still another aspect of the present invention is its application to nonwoven fabrics which comprise wood pulp fibers and/or textile-length fibers and which are made basically by conventional or modified aqueous paper making techniques. Such fabrics are also basically "isotropic" and generally have like properties in all directions.

The conventional base starting material for the majority of these nonwoven fabrics is usually a fibrous web comprising any of the common textile-length fibers, or mixtures thereof, the fibers varying in average length from approximately ½ inch to about 2½ inches. Exemplary of such fibers are the natural fibers such as cotton and wool and the synthetic or man-made cellulosic fibers, notably rayon or regenerated cellulose.

Other textile length fibers of a synthetic or man-made origin may be used in various proportions to replace either partially or perhaps even entirely the previously-named fibers. Such other fibers include polyamide fibers such as nylon 6, nylon 66, nylon 610, etc.; polyester fibers such as "Dacron", "Fortrel" and "Kodel"; acrylic fibers such as "Acrilan", "Orlon" and "Creslan"; modacrylic fibers such as "Verel" and "Dynel"; polyolefinic fibers derived from polyethylene and polypropylene; cellulose ester fibers such as "Arnel" and "Acele"; polyvinyl alcohol fibers; etc.

These textile length fibers may be replaced either partially or entirely by fibers having an average length of less than about ½ inch and down to about ¼ inch. These fibers, or mixtures thereof, are customarily processed through any suitable textile machinery (e.g., a conventional cotton card, a "Rando-Webber", a paper making machine, or other fibrous web producing apparatus) to form a web or sheet of loosely associated fibers, weighing from about 100 grains to about 2000 grains per square yard or even higher.

If desired, even shorter fibers, such as wood pulp fibers or cotton linters, may be used in varying proportions, even up to 100%, where such shorter length fibers can be handled and processed by available apparatus. Such shorter fibers have lengths less than ¼ inch.

The resulting fibrous web or sheet, regardless of its method of production, is then subjected to at least one of several types of bonding operations to anchor the individual fibers together to form a self-sustaining web. One method is to impregnate the fibrous web over its entire surface area with various well-known bonding agents, such as natural or synthetic resins. Such overall impregnation produces a nonwoven fabric of good longitudinal and cross strength, acceptable durability and washability, and satisfactory abrasion resistance. However, the nonwoven fabric tends to be somewhat stiff and boardlike, possessing more of the properties and characteristics of paper or board than those of woven or knitted textile fabric. Consequently, although such overall impregnated nonwoven fabrics are satisfactory for many uses, they are still basically unsatisfactory as general purpose textile fabrics.

Another well-known bonding method is to print the fibrous webs with intermittent or continuous straight or wavy lines, or areas of binder extending generally transversely or diagonally across the web and additionally, if desired, along the fibrous web. The resulting nonwoven fabric is far more satisfactory as a textile fabric than overall impregnated webs in that the softness, drape and hand of the resulting nonwoven fabric more nearly approach those of a woven or knitted textile fabric.

The printing of the resin binder on these nonwoven webs is usually in the form of relatively narrow lines, or elongated rectangular, triangular or square areas, or annular, circular, or elliptical binder areas which are spaced apart a predetermined distance which, at its maximum, is preferably slightly less than the average fiber length of the fibers constituting the web. This is based on the theory that the individual fibers of the fibrous web should be bound together in as few places as possible.

These resin colloidal dispersions, or resin emulsions, or latexes, may be anionic, non-ionic or even polyionic, and stable dispersions are available commerically at pH's of from about 2½ to about 10. For the purposes of the present invention, however, those resin compositions having low, acidic pH's must be pretreated, such as with sufficient ammonia, to bring them into the pH range of from about 7 up to about 10. It is in this pH range that the resin compositions of the present invention are used.

The amount of resin which is applied to the porous or absorbent material varies within relatively wide limits, depending upon the resin itself, the nature and character of the porous or absorbent materials to which the resins are being applied, its intended use, etc. A general range of from about 4% by weight up to about 50% by weight, based on the weight of the porous or absorbent material, is satisfactory under substantially all uses. Within the more commercial limits, however, a range of from about 10% to about 30% by weight, based on the weight of the porous or aborbent materials is preferred.

The nominal surface coverage of such binder lines or areas will vary widely depending upon the precise properties and characteristics of softness, drape, hand and strength which are desired in the final bonded product. In practice, the nominal surface coverage can be designed so that it falls within the range of from about 10% to about 50% of the total surface of the final product. Within the more commercial aspects of the present invention, however, nominal surface coverages of from about 12% to about 40% are preferable.

In certain cases, especially where larger proportions of short fibers are used, surface coverages of up to about 85% are often encountered and such are preferred in some applications of the present invention. Such bonding increases the strength of the nonwoven fabric and retains substantially complete freedom of movement for the individual fibers whereby the desirable softness, drape and hand are obtained. This spacing of the binder lines and areas has been accepted by the industry and it has been deemed necessarily so, if the stiff and board-like appearance, drape and hand of the overall impregnated nonwoven fabrics are to be avoided.

The nonwoven fabrics bonded with such line and area binder patterns have had the desired softness, drape & hand and have not been undesirably stiff or board-like. However, such nonwoven fabrics have also possessed some disadvantages.

For example, the relatively narrow binder lines and relatively small binder areas of the applicator (usually an engraved print roll) which are laid down on the fibrous web possess specified physical dimensions and inter-spatial relationships as they are initially laid down. Unfortunately, after the binder is laid down on the wet fibrous web and before it hardens or becomes fixed in position, it tends to spread, diffuse or migrate whereby its physical dimensions are increased and its inter-spatial relationships decreased. And, at the same time, the binder concentration in the binder area is lowered and rendered less uniform by the diffusion or migration of the binder into adjacent fibrous areas. One of the results of such migration is to make the surface coverage of the binder areas increase whereby the effect of the intermittent bonding approaches the effect of the overall bonding. As a result, some of the desired softness, drape and hand are lost and some of the undesired properties of harshness, stiffness and boardiness are increased.

It is therefore desirable that the narrow binder lines remain narrow and that they do not migrate into wide binder lines. As pointed out previously, such desirable features are provided by the use of the resin compositions of the present invention.

As pointed out previously, the resin composition which is applied to the porous or absorbent materials, comprises: (1) a colloidal synthetic resin and (2) an aluminum hydroxy salt of a high molecular weight, water-soluble, polymeric, polycarboxy-containing thickening resin as a migration control agent.

The Colloidal Synthetic Resins

The colloidal synthetic resins may be selected from a relatively large group of synthetic resins well known in industry for bonding, coating, impregnating, or related uses, and may be of a self cross-linking type, externally cross-linking type, or not cross-linked. Specific examples of such synthetic resins include: polymers and copolymers of vinyl ethers; vinyl halides such as plasticized and unplasticized polyvinyl chloride, polyvinyl chloride-polyvinyl acetate, ethylene-vinyl chloride, etc.; polymers and copolymers of vinyl esters such as plasticized and unplasticized polyvinyl acetate, ethylene-vinyl acetate, acrylic-vinyl acetate, etc.; polymers and copolymers of the polyacrylic resins such as ethyl acrylate, methyl acrylate, butyl acrylate, ethylbutyl acrylate, ethyl hexyl acrylate, hydroxyethyl acrylate, dimethyl amino ethyl acrylate, etc.; polymers and copolymers of the polymethacrylic resins such as methyl methacrylate, ethyl methacrylate, isopropyl methacrylate, butyl methacrylate, etc.; polymers and copolymers of acrylonitrile, methacrylonitrile, acrylamide, N-isopropyl acrylamide, N-methylol acryamide, methacrylamide, etc.; vinylidene polymers and copolymers, such as polyvinylidene chloride, polyvinylidene chloride-vinyl chloride, polyvinylidene chloride-ethyl acrylate, polyvinylidene chloride-vinyl chloride-acrylonitrile, etc.; polymers and copolymers of polyolefinic resins including polyethylene, polypropylene, ethylene-vinyl chloride and ethylene-vinyl acetate which have been listed previously; the synthetic rubbers such as 1,2-butadiene, 1,3-butadiene, 2-ethyl-1,3-butadiene, high, medium and carboxylated butadiene-acrylonitrile, butadiene-styrene, chlorinated rubber, etc., natural latex; the polyurethanes; the polyamides; the polyesters; the polymers and copolymers of the styrenes including styrene, 2-methyl styrene, 3-methyl styrene, 4-methyl styrene, 4-ethyl styrene, 4-butyl styrene; phenolic emulsions; etc.

These resins may be used either as homopolymers comprising a single repeating monomer unit, or they may be used as copolymers comprising two, three, or more different monomer units which are arranged in random fashion, or in a definite order alternating fashion, within the polymer chain. Also included within the inventive concept are the block polymers comprising relatively long blocks of different monomer units in a polymer chain and graft polymers comprising chains of one monomer attached to the backbone of another polymer chain.

The Migration Control Agent

To the aqueous dispersion of colloidal synthetic resin solids is added a small amount of from about 0.01% by weight to about 2% by weight, based on the dry solids weight of the colloidal synthetic resin, of an aluminum hydroxy salt of a high molecular weight, water-soluble, polymeric, polycarboxy-containing thickening resin.

The aluminum hydroxy salt of the high molecular weight, water-soluble polymeric, polycarboxy-containing thickening resin is formed by reaction of (1) a suitable aluminum salt and (2) ammonium hydroxide or an alkali metal hydroxide and (3) a high molecular weight, water-soluble, polymeric, polycarboxy-containing thickening resin.

The Aluminum Salt

The aluminum salt is water-soluble. Specific examples of such water-soluble aluminum salts are aluminum acetate, aluminum bromate, aluminum chlorate, aluminum chloride, aluminum iodide, aluminum lactate, aluminum nitrate, aluminum sulfate, aluminum thallium sulfate, etc.

The Ammonium Hydroxide

The ammonium hydroxide may be used in any form or in any concentration but is preferably used in the standard commercially available concentration (aqueous, 28% $NH_3$). Unless specifically stipulated otherwise, this commercially available form is the form used herein.

The Water-Soluble, High Molecular Weight, Polymeric, Polycarboxy-Containing Thickening Resin The high molecular weight, water-soluble, polymeric, polycarboxy-containing thickening resin may be selected from a relatively large group of such materials which include, for example: polyacrylic acid; polymeric crotonic acid; copolymers of vinyl acetate and crotonic acid; copolymers of vinyl acetate and acrylic acid; polyacrylic acid-polyacrylamide copolymers; polymethacrylic acid; polymethacrylic acid-polyacrylamide copolymers; carboxymethyl cellulose; carboxyethyl cellulose; carboxypropyl cellulose; polycarboxymethyl hydroxyethyl cellulose; alginic acid; polymers of acrylic acid and acrylic acid esters; polymers of $\alpha,\beta$-unsaturated carboxylic acids such as itaconic acid; etc. These water-soluble, polymeric, carboxylic thickeners may be used in their acid forms but normally it is preferred to use their water-soluble, neutralized salts, that is, their sodium, potassium, lithium, ammonium, or like water-soluble salts.

It is to be observed that all of these high molecular weight, water-soluble, polymeric, polycarboxy-containing thickening resins contain generally a main long chain comprising a large number of monomeric units from which the carboxylic groups extend. It is not essential that only carboxylic groups extend from the main long chain; other groups may so extend such as in the case of acrylic acid-acrylamide copolymers. In the case of monomeric units having more than one site for a carboxylic radical, such as in the case of carboxymethyl cellulose which may contain up to three sites, it is not essential that all sites have the carboxylic radical. There merely must be a sufficient number of carboxylic groups to react with the aluminum salt to pave the way for subsequent coagulation and precipitation.

It is believed that the chemical structure of the migration control agent is as follows, with the long horizontal line generally representing the main long chain of the high molecular weight, water-soluble, polymeric, polycarboxy-containing thickening resin from which the carboxylic radicals or groups originally extended:

In this structural formula, only two aluminum hydroxy carboxylate salt groups are shown but it is to be appreciated that there are many more carboxylate groups. It is also to be appreciated that it is not essential that all the carboxylic groups of the polycarboxylic polymer be reacted with the aluminum salt and that only from about 25% to about 100% need be so reacted.

Another way to set forth this structural formula is therefore as follows:

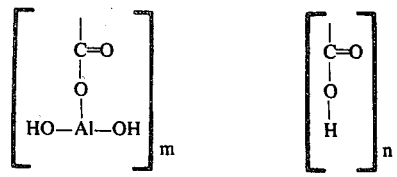

wherein $m + n = 100\%$; $m = 20$ to $100\%$; and $n = 0$ to $80\%$.

Another way to phrase the relationship between $m$ and $n$ is that the ratio of $m/(m+n)$ is from about 0.20 to 1.

The colloidal synthetic resin composition containing the colloidal synthetic resin and the aluminum hydroxy salt of the high molecular weight, water-soluble, polymeric, polycarboxy-containing thickening resin is applied to the porous or absorbent material and is substantially immediately coagulated and precipitated in place under controlled migration conditions.

The dilution may be effected in different ways in order to activate the reaction mechanism. For example, the porous or absorbent fibrous material may be pre-treated by being pre-wet with a sufficient quantity of an aqueous medium, preferably water, whereby the colloidal resin composition immediately becomes sufficiently diluted. Or, if desired, the colloidal resin composition may be first printed on the porous or absorbent fibrous material and then substantially immediately treated with the aqueous medium such as water to effect the dilution whereupon the colloidal resin particles substantially immediately agglomerate or coagulate in place with no further spreading, diffusion or migration.

The amount of the water applied to the fibrous web varies widely, depending upon many factors, the most important of which is the nature, concentration, properties and characteristics of the synthetic resin, the aluminum hydroxy salt, and the surfactant system in which they are stabilized. Normally, the amount of water applied to the fibrous web is in the range of from about 140% to about 280%, and preferably from about 160% to about 220%, based on the weight of the fibrous web being treated. Such amounts are controlled by the use of suitable conventional vacuum apparatus, nip rolls, squeeze-rolls, etc.

The amount of water which is applied to the fibrous web prior to the printing of the resin binder also affects the degree of control exercised over the coagulation and migration. The greater the amount of water, the greater is the control and the more rapid is the coagulation and the less is the migration. On the other hand, the less the amount of water in the fibrous web, the less is the control exercised, the less rapid is the coagulation, and the greater is the migration.

The degree of coagulation may be lowered even more and the degree of migration may be increased by the inclusion in the pre-wetting water of a small amount of an alkaline or basic material such as ammonium hydroxide. The pH remains alkaline, just as it does in other variations of this invention, and the coagulation and precipitation are purely the result of the dilution.

When printed on a pre-wetted fibrous web during the manufacture of nonwoven fabrics, the total migration of the resin binder solids may be reduced to as little as about 50% or less beyond the originally deposited area. In some instances, the migration is relatively negligible. Normally, however, the increase in area of the resin binder solids, even under the most adverse conditions, does not materially exceed about 200%. Such values are to be compared to increases in binder migration of at least about 300% and up to about 800% when emulsion polymerized resins are applied to fibrous porous absorbent sheet materials, unaided by the principles disclosed herein.

The concentration of the binder resin solids in the binder area is correspondingly increased when utilizing the principles of the present invention and is in the range of from about 50% by weight to about 120% by weight, and more normally from about 60% to about 80% by weight, based on the weight of the fibers in the binder area.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE I

Aluminum hydroxy salts of a high molecular weight, water-soluble, polymeric, polycarboxy-containing thickening resin are prepared from:

A.

500 ml. water
5 grams "SUPERLOID" ammonium alginate
13 ml. 5% commericial grade aluminum acetate
comm. ammonia to pH 7.8
(Viscosity is 1400 cps)

B.

650 ml. water
7.5 grams "SUPERLOID" ammonium alginate
3.5 ml. 25% commercial grade aluminum acetate
comm. ammonia to pH 8.2
(Viscosity is 3200 cps)

C.

500 ml. water
10 grams "COLLATEX ARM SPECIAL" ammonium alginate
0.5 ml. comm. ammonia to pH 8.5 (viscosity - 2240 cps)
3 ml. 25% commercial aluminum acetate
(Viscosity is 17,000 cps)
Additional 1½ ml. 25% commercial grade aluminum acetate (viscosity is 65,000 cps)
Additional 250 ml. water (viscosity is 5000 cps)

D.

1000 ml. water
10 grams "COLLATEX ARM SPECIAL" ammonium alginate
ammonia to pH 8.3
3⅓ ml. 25% commercial grade aluminum acetate (viscosity is 320 cps)
Additional 3⅓ ml. 25% commercial grade aluminum acetate (viscosity is 680 cps)
Additional 2⅓ ml 25% commercial grade aluminum acetate (viscosity is 20,000 cps)

E.

300 ml. water
300 ml. 5% "SUPERLOID" ammonium alginate
15 ml. comm. ammonia
9 ml. 25% aluminum acetate (commercial grade)
30 ml. water

F.

300 ml. water
300 ml. 1% "SUPERLOID" ammonium alginate
15 ml. comm. ammonia 18 ml. 25% aluminum acetate (commercial grade)
18 ml. water
pH is 10.2 (viscosity is 760 cps)

G.

0.50 pounds water
0.50 pounds acrylic acid-acrylamide copolymer solution (10% solids)
100 ml. 5% aluminum acetate (commercial grade)
comm. ammonia to pH 7.2
(Viscosity is 4000 cps)

H.

990 ml. water
10 gms. "COLLATEX ARM SPECIAL" ammonium alginate
45 ml. comm. ammonia
50 ml. 25% aluminum acetate (commercial grade)
50 ml. water

I.

500 ml. water
5 grams "KELGIN F" sodium alginate
13 ml. 5% commercial grade aluminum acetate
3% aqueous sodium hydroxide to pH 8.4

Viscosities, as set forth herein and in all Examples are measured in centipoises, as determined on a Brookfield Viscosimeter, Model LVF, 30 rpm. using a No. 3 spindle.

EXAMPLE II

The procedures of the immediately preceding Example I, preparation G, are repeated, replacing the acrylic acid-acrylamide copolymer with:

| 1. | "Acrysol 51" | an acrylic acid-acrylamide copolymer solution (10% solids) (molecular weight 375,000–500,000) |
|---|---|---|
| 2. | Hercules Carboxymethyl Cellulose 7H35 | (D.S. 0.65–0.85) (molecular weight in excess of 200,000) |
| 3. | Hercules Carboxymethyl Cellulose 7M | (D.S. 0.65–0.85) (molecular weight in excess of 70,000) |
| 4. | Hercules Carboxymethyl Cellulose 12M8 | (D.S. 1.2–1.4) (molecular weight in excess of 100,000) |
| 5. | Polyacrylic Acid. | |
| 6. | Goodyear "Carboset 514" polyacrylate copolymer | |
| 7. | R&H "Acrysol A-5" polyacrylate homopolymer | |

The results are generally comparable to those obtained in Example I, preparation (G). The resin binder migration control agent is excellent for use in the preparation of bonded nonwoven fabrics as noted in subsequent examples.

EXAMPLE III

The procedures of Example I, preparations (A), (G) and (H) are repeated substantially as set forth therein with the exception that the aluminum acetate is replaced by equivalent (stoichiometric) amounts of water-soluble aluminum chloride, aluminum nitrate, and aluminum sulfate.

The results are generally comparable to those obtained in Example I. The resulting aluminum hydroxy carboxylates are of use in subsequent Examples in resin migration control functions.

EXAMPLE IV

A fibrous card web weighing about 500 grains per square yard and comprising 100 % bleached rayon fibers, 1½ denier and 1-9/16 inches in length is intermittently print bonded by the rotogravure process using an engraved roll having 4½ horizontal wavy lines per inch. The width of each line, as measured on the engraved roll is 0.024 inch.

The composition by weight of the resin binder composition used for the intermittent print bonding is:

5 pounds of NS4260, primarily a self cross-linking polyethyl acrylate acrylic polymer (50% solids latex)
0.5 pound of the aluminum hydroxy alginate salt aqueous solution prepared in Example I(C) (5000 cps).
0.15 ml. of ammonia (aqueous, commercial, 28% $NH_3$) to a pH of 8.4 and a viscoisty of 340.

The fibrous card web is pretreated or pre-moistened with a large amount of water to the extent of about 210% moisture based on the dry weight of the fibers in the card web.

The extra dilution of the card web with water is sufficient by itself to upset the stability of the colloidal resin dispersion when applied to the fibrous card web and it substantially immediately coagulates and precipitates on the very wet fibrous card web under controlled migration, spreading, or penetration conditions. The printed web is then further processed, dried and cured, using conventional or standard techniques.

EXAMPLE V

The procedures set forth in Example IV are followed substantially as set forth therein with the exception that the NS4260 self cross-linking polyethyl acrylate acrylic polymer (50% solids latex) is replaced by an equivalent weight of other polymers namely:

| A. | "Vinacryl 4322" | a vinyl acetate-acrylic copolymer (50% solids latex) |
|---|---|---|
| B. | "EVA 1968" | an ethylene-vinyl acetate copolymer (50% solids latex |
| C. | "NS2892" | a polyvinyl acetate polymer (51.5% solids latex) |
| D. | "GEON 576" | a polyvinyl chloride-lower alkyl acrylate copolymer (46% solids latex) |
| E. | "GAF 243" | a carboxylated butadiene-styrene copolymer (50% solids latex) |
| F. | "Airflex 510" | an ethylene-vinyl acetate copolymer (55% solids latex) |
| G. | "Goodrich 2671" | an ethyl acrylate-acrylonitrile copolymer (46% solids latex) |
| H. | "NS Resyn 2345" | a polyvinyl acetate-acrylate copolymer (55% solids latex) |
| I. | "R&H HA-8" | a polyethyl acrylate polymer (50% solids latex) |

The results are generally comparable to those obtained in Example III. The binder migration control i excellent in the bonded nonwoven fabric.

EXAMPLE VI

A resin migration control agent is prepared from:
5.6 lbs of "SUPERLOID" 1% ammonium alginate
45 ml. 25% aqueous aluminum acetate
commercial ammonia to pH 9.2
Viscosity is 6800 cps.

0.5 lbs. of this aqueous preparation is added to 5 lbs. of NS4260, self cross-linking polyethyl acrylate acrylic copolymer, and 0.15 ml. commercial ammonia.

When applied to a fibrous card web such as described in Example IV, the results are generally comparable to those obtained in Example IV and the resin migration control is good.

EXAMPLE VII

The procedures of Example VI are followed substantially as set forth except that the NS4260 self cross-linking polyethyl acrylate-acrylic copolymer is replaced by Vinacryl 4322, a vinyl acetate-acrylic copolymer.

The results are generally comparable to those obtained in Example VI and the resin migration control is good.

EXAMPLE VIII

The procedures of Example IV are followed substantially as set forth therein with the exception that the aluminum hydroxy alginate salt is prepared, using Kelgin F, a sodium salt of alginic acid, rather than the ammonium salt, as described in Example I(C).

The results are generally comparable to those obtained in Example IV and the control over the resin migration is good.

Although the present invention has been described and illustrated with reference to preferred embodiments thereof, it is to be appreciated that such is merely for the purpose of disclosing the invention and is not to be construed as limitative of the broader aspects of the inventive concept except as defined by the appended claims.

It is also to be appreciated that these preferred embodiments, particularly as noted in the illustrative working example, ennumerate primarily only the essential or critical constituents in the various formulations and that other constituents such as anti-oxidants, anti-corrosion agents, pigments, foam inhibitors, surfactants, and other additives have not been set forth specifically.

What is claimed is:

1. Stable, aqueous, colloidal, synthetic resin compositions having an alkaline pH comprising: (1) from about 0.1% by weight to about 60% by weight of a colloidal synthetic resin; and (2) from about 0.01% by weight to about 2% by weight based on the dry solids weight of the colloidal synthetic resin, of an aluminum hydroxy salt, said aluminum hydroxy salt being a reaction product of (a) an aluminum salt; (b) a hydroxide selected from the group consisting of ammonium hydroxide and alkali metal hydroxides; and (c) a high molecular weight, water-soluble, polymeric, poly-carboxy-containing thickening resin.

2. A synthetic resin composition as defined in claim 1 wherein the aluminum hydroxy salt of the high molecular weight, water-soluble, polymeric, polycarboxy-containing thickening resin has the structural formula:

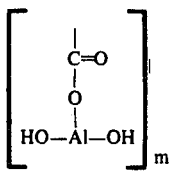 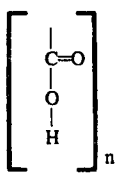

wherein the long horizontal line represents the main long chain of the high molecular weight, water-soluble, polymeric, polycarboxy-containing thickening resin from which carboxylic groups extend; and the ratio $m/(m+n)$ is from about 0.20 to 1.

3. A synthetic resin composition as defined in claim 1 wherein the high molecular weight, water-soluble, polymeric, polycarboxy-containing thickening resin is alginic acid.

4. A synthetic resin composition as defined in claim 1 wherein the high molecular weight, water-soluble, polymeric, polycarboxy-containing thickening resin is carboxymethyl cellulose.

5. A synthetic resin composition as defined in claim 1 wherein the high molecular weight, water-soluble, polymeric, polycarboxy-containing thickening resin is polyacrylic acid.

6. A synthetic resin composition as defined in claim 1 wherein the high molecular weight, water-soluble, polymeric, polycarboxy-containing thickening resin is a polyacrylate polymer.

7. A synthetic resin composition as defined in claim 1 wherein the high molecular weight, water-soluble polymeric, polycarboxy-containing thickening resin is a polyacrylic acid-acrylamide copolymer.

8. A method of applyiing a stable, aqueous colloidal synthetic resin composition to porous materials and controlling its migration thereon which comprises applying to porous materials a stable, aqueous colloidal synthetic resin composition having an alkaline pH comprising: (1) from about 0.1% by weight to about 60% by weight of a colloidal synthetic resin; and (2) from about 0.01% by weight to about 2% by weight, based on the dry solids weight of the colloidal synthetic resin of an aluminum hydroxy salt of a high molecular weight, water-soluble, polymeric, polycarboxy-containing thickening resin; and substantially immediately diluting the synthetic resin composition to substantially immediately coagulate and precipitate the synthetic resin composition.

9. A method of applying a synthetic resin composition to porous materials and controlling its migration thereon as defined in claim 8, wherein the aluminum hydroxy salt of the high molecular weight, water-soluble, polymeric, polycarboxy-containing thickening resin has the structural formula:

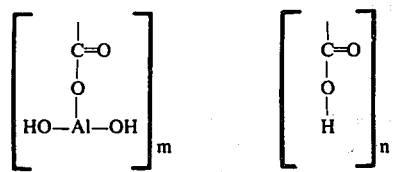

wherein the long horizontal line represents the main long chain of the high molecular weight, water-soluble, polymeric, polycarboxy-containing thickening resin from which carboxylic groups extend; and the ratio $m/(m+n)$ is from about 0.20 to 1.

10. A method of applying a synthetic resin composition to porous materials and controlling its migration thereon as defined in claim 8, wherein the high molecular weight, water-soluble, polymeric, polycarboxy-containing thickening resin is alginic acid.

11. A method of applying a synthetic resin composition to porous materials and controlling its migration thereon as defined in claim 8 wherein the high molecular weight, water-soluble, polymeric, polycarboxy-containing thickening resin is carboxymethyl cellulose.

12. A method of applying a synthetic resin composition to porous materials and controlling its migration thereon as defined in claim 8 wherein the high molecular weight, water-soluble, polymeric, polycarboxy-containing thickening resin is polyacrylic acid.

13. A method of applying a synthetic resin composition to porous materials and controlling its migration thereon as defined in claim 8 wherein the high molecular weight, water-soluble, polymeric, polycarboxy-containing thickening resin is a polyacrylate polymer.

14. A method of applying a synthetic resin composition to porous materials and controlling its migration thereon as defined in claim 8, wherein the high molecular weight, water-soluble, polymeric, polycarboxy-containing thickening resin is a polyacrylic acid-acrylamide copolymer.

* * * * *